United States Patent Office 3,536,763
Patented Oct. 27, 1970

3,536,763
HYDRATION OF ACROLEIN TO HYDRACRYLALDEHYDE
Herbert S. Eleuterio, Wilmington, and Theodore A. Koch, Holly Oak, Del., assignors to E. I. du Pont de Nemours and Company, Wilmington, Del., a corporation of Delaware
No Drawing. Continuation-in-part of application Ser. No. 537,702, Mar. 28, 1966. This application Aug. 30, 1967, Ser. No. 664,316
Int. Cl. C07c 45/00
U.S. Cl. 260—602      20 Claims

ABSTRACT OF THE DISCLOSURE

Hydration of acrolein to hydracrylaldehyde in the presence of a heterogeneous hydration catalyst composed of a solid weakly acidic carboxylic cation exchange resin insoluble in the system, preferably containing from 0.1% and not more than about 5% metal ions e.g., calcium, on the resin.

---

This application is a continuation-in-part of application Ser. No. 537,702, filed Mar. 28, 1966 now abandoned.

BACKGROUND OF THE INVENTION

The hydration of olefinic aldehydes, such as acrolein, has been previously accomplished by employing ionized acids, particularly strongly ionized acids such as sulfuric acid and hydrochloric acid, in combination with water, as described, for example, in U.S. Pat. 2,434,110. These substances, i.e., the strongly ionized acids, act as hydration catalysts and produce hydrogen ions in the aqueous reaction medium, thus forming the corresponding hydrated compound, e.g., hydracrylaldehyde when acrolein is hydrated. These procedures can be classified as homogeneous hydration processes because the acid hydration catalyst and other reactants are in the liquid phase. Although such single phase homogeneous hydration processes are reasonably satisfactory they have certain serious drawbacks. For example, when acrolein is hydrated to hydracrylaldehyde in a homogeneous system substantial quantities of undesirable by-products form during the reaction, e.g., the conjugated acrolein dimer or precursors, and thus subsequently lessen the yield of hydracrylaldehyde. Then, too, the acrolein dimer reacts with acrolein to form so-called "polymerization heels." In addition, the acid catalysts of prior processes are partially consumed during the reaction resulting in contamination of hydracrylaldehyde with the acid. In addition, the acid must be removed from the hydrated product, e.g., by neutralization, prior to use. Furthermore, in methods taught in the art the yield of hydracrylaldehyde is usually dependent on the level of acrolein conversion. For example, using a sulfuric acid catalyst as described in the above mentioned patent a three-fold decrease in hydracrylaldehyde yield occurs when the acrolein conversion is increased from approximately 30 to 80 percent. Whereas by the process of this invention a high yield of hydracrylaldehyde is obtained regardless of the conversion of acrolein. The yield of hydracrylaldehyde remains substantially constant and high (~80%) over a wide range of conversion values (25–65%). Furthermore, high yields of trimethylene glycol are obtained on catalytic hydrogenation of hydracrylaldehyde.

SUMMARY OF THE INVENTION

It has now been discovered that high yields of hydracrylaldehyde are obtained by a process which comprises reacting acrolein with water in the presence of a heterogeneous hydration catalyst composed of a solid weakly acidic carboxylic cation exchange resin which is substantially insoluble in the system. It has further been discovered that conversion values of acrolein to hydracrylaldehyde remain consistently high during long periods of continuous use if the cation exchange resin contains from 0.1% to 5%, preferably 0.5% to 1% metal ions based on the amount of carboxylic groups on the resin.

DESCRIPTION OF PREFERRED EMBODIMENTS

The present hydration process requires the utilization of a weakly acidic carboxylic acid cation exchange resin for use as the hydration catalyst for conversion of acrolein to hydracrylaldehyde. Cation exchange resins are well known and commercially readily available and any weakly acidic carboxylic acid cation exchange resin can be used in the process. By weakly acidic is meant those ion exchange resins that have a pKa value between about 3.9 to 6.9 and preferably from 4.7 to 6.5. Due to the fact that such solid weakly acidic carboxylic cation exchange resins are insoluble in the reaction system a heterogeneous system is formed, i.e., acrolein is in solution in water and the cation exchange resin is, and remains, in the solid state. The cation exchange resin is in the acid form and composed mainly of cation exchange groups that are derived from various acids which include, for example, acrylic acid, methacrylic acid, polyacrylic acid, itaconic acid, maleic acid and fumaric acid. The cation exchange resins used also contain compounds that form cross-linkable units with the acid constituent and include, for example, carboxypentyl vinyl ether, polyvinyl aryl compounds such as divinyl ether benzene, divinyl chlorobenzene and alpha methyl styrene. The cation exchange resin can be employed in any form, preferably particulate. The mesh size (U.S. Standard Sieve) of said cation exchange resin in particulate form is preferably from about 16 to 50, which is the usual mesh size for commercially available cation exchange resins. Cation exchange resins are marketed under various trade names and particularly good results have been obtained employing the weakly acidic carboxylic acid cation exchange resins identified as "Amberlite" IRC–84 manufactured by Rohm & Haas and "Rexyn" RG–51(H) manufactured by the Fisher Scientific Company. Other suitable representative weakly acidic carboxylic acid cation exchange resins are, for example, "Alkalex" manufactured by the Research Products Co., "Duolite" CS–100 manufactured by Chemical Processes, "Wofatite" C manufactured by I. G. Farben, "Permutit" H manufactured by Permutit Company and "Amberlite" IRC–50 manufactured by Rohm & Haas.

It has been found that the conversion of acrolein to hydracrylaldehyde can be maintained at consistently high levels provided that the weakly acidic carboxylic cation exchange resin contains about from 0.1 to 5%, and preferably 0.1 to 1%, metal ions based on the amount of carboxylic groups on the resin. Any metal ion can replace the available hydrogen of the carboxylic group provided that the metal does not undergo a redox valence change in the system. The metal of Groups I, II and III of the Periodic Table are particularly suitable. Representative metals are, for example, lithium, sodium, potassium, cesium, barium, magnesium, beryllium, scandium, aluminum, gallium and tellurium. The metals of Group II are most preferable, especially the bivalent metals, for example calcium.

Before beginning the actual process, the carboxylic cation exchange resin can be treated in any suitable manner in order to incorporate the metal ions on the acid groups to form salts thereof. For example, one satisfactory procedure is to contact an aqueous slurry of the carboxylic acid cation exchange resin, e.g., "Amberlite" IRC–84, with an aqueous solution of acid, e.g., 2–10% concentration of hydrochloric acid, to be assured that substantially all the groups on the resin are carboxylic. The acid treated resin is washed with water and then slurried in a saturated solution containing a metal ion in order to add metal ions to the carboxylic sites of the cation exchange resin. The treated cation exchange resin containing metal ions is washed with distilled water to substantially remove free metal that may be present.

The weakly acidic carboxylic cation exchange resin catalysts modified with a suitable metal ion as described hereinabove retain their catalytic efficiency for the disclosed hydration process for a protracted time; for example, for several months of continual use. The cation catalyst may, nevertheless, lose some of its catalytic efficiency upon extended and long continued use. In this event, the resin may be readily regenerated by treatment with a nonoxidizing acid, e.g., dilute hydrochloric, sulfuric or phosphoric acid, with preferably, subsequent suitable metal ion addition to the resin by treating the resin with stoichiometric concentrations of salts of the desired metal ion.

The temperature at which the hydration reaction can be conducted is not critical and can vary over a wide range. However, from a practical point, temperatures below about 40° C. require substantially longer reaction times to make hydracrylaldehyde and temperatures much above about 120° C. adversely affect the thermal stability of the carboxylic cation exchange resin catalyst. Preferably a temperature range of from about 50° to 100° C. is employed. The temperature is correlated to the reaction time and at higher temperatures the rate of reaction is increased. In general, the time necessary to convert acrolein to hydracrylaldehyde within the above temperature range is from about 0.5 to 10 hours. The reaction can be conducted at atmospheric pressure and at superatmospheric pressures. Pressures at least just sufficient to keep the acrolein in the liquid state can be employed. Therefore, when the reaction is conducted above about 52° C., which is the boiling point of acrolein, pressure at least sufficient to maintain acrolein in the liquid state, is employed. Usually, it is not advisable to employ pressures in excess of 500 p.s.i.g. because such procedures require more expensive equipment. Pressures from atmospheric up to about 165 p.s.i.g. have been found to be a convenient operating range.

The concentration of the reactants is not critical and can vary widely. In general, the acrolein concentration ranges from about 5 to 30 percent, the balance, namely 95 to 70 percent being water. Best results are obtained when the concentration of acrolein is from 14 to 20 percent, balance water. More or less amounts of acrolein may be used but such concentrations would lessen the overall efficiency and economics of the reaction. The ratio of cation exchange resin to acrolein used in the process can also vary over a considerable range. Generally, a ratio of acrolein to carboxylic cation exchange resin of from about 1:100 to 1:1 is satisfactory for the process and preferably from about 1:10 to 1:4. Flow rates of the aqueous acrolein solution through the carboxylic cation exchange resin are generally from about 0.5 to 10 reciprocal hours and usually between about 1.4 to 3.3 reciprocal hours.

A polymerization inhibitor may be added, if desired, to the reaction mixture of acrolein and water in order to substantially prevent polymerization from occurring during the hydration reaction. The inhibitor may be added separately or admixed with the aqueous acrolein. Any polymerization inhibitor may be used in the process and the addition of small amounts of polymerization inhibitor within a range of from about 0.05 to 1 percent substantially prevent polymerization from occurring. Polymerization inhibitors which are commonly used to inhibit free radical polymerization are especially effective, for example, dibutyl p-cresol, tertiary butyl catechol, nitric oxide and di-t-butyl phenol sulfides. Such inhibitors are especially effective when used in the process, even in small quantities, and thus increase the percent of yield of hydracrylaldehyde.

The hydration reaction of the present invention can be carried out batchwise, intermittently or continuously. One advantageous procedure of a continuous reaction comprises suspending the chosen carboxylic cation exchange resin catalyst in water in a column and adding an aqueous solution of acrolein to the column containing the cation exchange resin catalyst. In a continuous reaction the cationic exchange resin catalyst is generally used as a bed of granular catalyst through which an aqueous solution of acrolein to be hydrated is fed at a controlled rate so as to provide sufficient time or contact with the catalyst to achieve the desired conversion. As a rule it is preferable to feed the reactants, i.e., water and acrolein, premixed as an aqueous solution of acrolein into the bottom of the column or tower packed with the particulate catalyst while withdrawing hydracrylaldehyde from the top of the tower. However, it is feasible to operate with the opposite direction of flow in the catalyst tower.

The resultant product, i.e., hydracrylaldehyde, can be used for many purposes. For example, the hydracrylaldehyde obtained from the process of this invention can be converted to trimethylene glycol by conventional methods of catalytic hydrogenation. For example, hydracrylaldehyde in the aqueous phase may be hydrogenated in a vessel at hydrogen pressures in the range of from about 1500 to 2500 p.s.i.g. in the presence of a suitable hydrogenation catalyst, such as platinum, Raney nickel, copper chromite and catalytically active compounds of metals such as aluminum, titanium and zirconium. The temperature of the reaction may be from about 20° C. to 120° C. for a time sufficient to complete the reaction, normally of the order of about two to three hours at 75° C. The resultant trimethylene glycol is cooled to ambient temperature, hydrogen pressure released and the hydrogenation catalyst filtered off the product. The trimethylene glycol is purified by vacuum distillation. Trimethylene glycol may be used in antifreeze preparation, as a plasticizer and as intermediates in making polymeric linear terephthalic esters useful for their filament and film-making characteristics.

The following specific examples illustrate the invention in detail. Amounts are by volume percent unless otherwise indicated.

EXAMPLE 1

A cylindrical glass reaction column 48 inches long by 12 mm. inside diameter having an outer cooling jacket is charged with 138 cc. of a weakly acidic carboxylic cation exchange resin identified as "Rexyn" RG–51(H), commercially available from Fisher Scientific Co., and composed of a methacrylic acid divinylbenzene copolymer. The cation exchange resin has a pKa value of about 6 and a particle size of from 16 to 50 mesh. Sufficient water is added to the column in order to suspend the cation exchange resin in the water. Water, heated to about 50° C., is circulated through the outer jacket of the reaction column and a solution of 20% acrolein and 80% water is pumped through the wet carboxylic acid cation exchange resin catalyst at a rate of about 200 to 250 cc./hr. The mixture leaving the column is principally hydracrylaldehyde and the product was analyzed by gas chromatography and confirmed to be hydracrylaldehyde.

EXAMPLE 2

A cylindrical glass reaction column 48 inches long by 12 mm. inside diameter having an outer cooling jacket is charged with 138 cc. of a weakly acidic carboxylic acid cation exchange resin identified as "Amberlite" IRC–84, commercially available from Rohm & Haas, and composed of a polyacrylic acid divinylbenzene copolymer. The cation exchange resin has a pKa value of about 5.2 and a particle size of from 16 to 50 mesh. Water is added to the column in order to suspend the cation exchange resin in the water. Water, heated to about 48° C., is circulated through the outer jacket of the reaction column and a solution of 20% acrolein and 80% water is pumped through the wet carboxylic acid cation exchange resin catalyst at a rate of about 200 to 250 cc./hr. The resin catalyst is in a suspended state and good contact is provided between the reactants and the catalyst. The product obtained from the reaction was analyzed and found to be hydracrylaldehyde.

EXAMPLES 3 TO 5

The following examples were conducted according to the procedure described in Example 1 hereinabove with modifications in time, temperature, concentration and pressure, as indicated in the table.

| Example | Acrolein conc., percent vol. | Water conc., percent | Pressure, p.s.i.g. | Hours | °C. | Acrolein conversion,[1] percent | Hydracrylaldehyde,[2] percent | Weakly acidic carboxylic cation resin catalyst |
|---|---|---|---|---|---|---|---|---|
| 3 | 20 | 80 | Atmos. | 4 | 50 | 30 | 98 | "Amberlite" IRC–84 (pKa about 5.2). |
| 4 | 30 | 70 | 62 | 1 | 95 | | 95 | "Rexyn" RG–51(H) (pKa about 6). |
| 5 | [3] 20 | 80 | 75 | 2 | 90 | 50 | [4] 98 | "Amberlite" IRC–84 (pKa about 5.2). |

[1] $\dfrac{\text{Moles of hydracrylaldehyde formed}}{\text{Moles of acrolein fed}} \times 100$

[2] $\dfrac{\text{Moles of hydracrylaldehyde formed}}{\text{Moles of acrolein consumed}} \times 100$

[3] Contains 0.1% (by weight based on acrolein) hydroquinone.
[4] On hydrogenation, an 85% in-hand yield of trimethylene glycol was obtained.

EXAMPLE 6

800 ml. of the carboxylic cation exchange resin identified as "Amberlite" IRC–84, commercially available from Rohm and Haas, and composed of polyacrylic acid divinyl benzene copolymer is treated with two one-liter portions of about 5% aqueous hydrochloric acid to be assured substantially all the carboxyl groups contain hydrogen. The treated resin is washed chloride-ion-free to silver nitrate and divided into four equal parts of 200 ml. portions identified as Portions A, B, C and D.

Portion A is treated with 480 ml. of saturated $Ca(OH)_2$ in about a one-liter volume slurry of said cation exchange resin and water. The resulting metal ion containing resin is filtered and washed with distilled water to remove calcium ion not bound to the resin. Chemical analysis shows the calcium ion concentration on the resin to be from 0.1 to 0.6% and the resin has a pKa of about 5.2.

The procedure described in Example 2 is repeated with the calcium treated resin and about a 92% yield of hydracylaldehyde is consistently obtained over extended periods of use.

EXAMPLE 7

Portion B of the above-mentioned cation exchange resin is treated with 0.4 gram of NaOH in about 400 ml. of water. The resin is then filtered and washed substantially free of caustic with distilled water. Chemical analysis shows the sodium ion concentration on the resin to be from 0.2 to 1% and the resin has a pKa of about 5.2.

The procedure described in Example 2 is repeated with the sodium treated resin and about a 78% yield of hydracrylaldehyde is consistently obtained over extended periods of use.

EXAMPLE 8

Portion C of the above-mentioned cation exchange resin is treated with 4.5 grams of $Al(NO_3)_3 \cdot 9H_2O$ in 50 ml. of water. The resin is then filtered and washed with distilled water to remove aluminum ion not bound to the resin. Chemical analysis shows the aluminum ion concentration on the resin to be 0.2 to 0.8% and the resin has a pKa of about 5.2.

The procedure described in Example 2 was repeated with the aluminum treated resin and about an 83% yield of hydracrylaldehyde is consistently obtained over extended periods of use.

EXAMPLE 9

Portion D is treated with 4.2 grams of $Ba(OH)_2 \cdot 8H_2O$ in 600 ml. of water. The resin is then filtered and washed with distilled water to remove barium ion not bound to the resin. Chemical analysis shows the barium ion concentration on the resin to be from 0.1 to 0.6% and the resin has a pKa of about 5.2.

The procedure described in Example 2 is repeated with the barium-treated resin and about an 87% yield of hydracrylaldehyde is consistently obtained over extended periods of use.

EXAMPLE 10

One liter of the hydracrylaldehyde solution obtained from the process described in Example 5 above was added to a 1.5 liter Hastelloy autoclave. Two grams of a platinum catalyst (i.e. 5% platinum on alumina) was added to the hydracrylaldehyde solution in the autoclave. The reaction vessel was pressurized to 2000 p.s.i.g. with hydrogen at a temperature of 100° C. for two hours thereby obtaining trimethylene glycol. The autoclave was then allowed to cool to room temperature and excess hydrogen vented to the atmosphere. The resulting reaction product was removed from the vessel and the catalyst separated by filtration. The excess water in the glycol is removed at 20 mm. pressure at 100° C. Distillation of the dewatered product at 105 to 115° C. at 10 mm. pressure results in the recovery of about 98 grams of trimethylene glycol, which is approximately an 87% yield.

What is claimed is:

1. A process for making hydracrylaldehyde which comprises reacting acrolein with water in the presence of, as a hydration catalyst a solid weakly acidic carboxylic cation exchange resin insoluble in the system and recovering hydracrylaldehyde.

2. A process according to claim 1 wherein the pKa value of the weakly acid carboxylic cation exchange resin is from about 3.9 to about 6.9.

3. A process according to claim 1 wherein the pKa value of the weakly acid carboxylic cation exchange resin is from about 4.7 to 6.5.

4. A process according to claim 1 wherein the carboxylic cation exchange resin contains from 0.1% to 5% metal ions that do not undergo a redox valence change in the system.

5. A process according to claim 1 wherein the carboxylic cation exchange resin contains from 0.5% to 1% metal ions that do not undergo a redox valence change in the system.

6. A process according to claim 5 wherein the metal ions are elements of Group II–A.

7. A process according to claim 6 wherein the metal ions are calium.

8. A process according to claim 5 wherein the metal ions are sodium.

9. A process according to claim 5 wherein the metal ions are aluminum.

10. A process according to claim 5 wherein the metal ions are barium.

11. A process according to claim 1 wherein the carboxylic cation exchange resin catalyst is a copolymer of polyacrylic acid and divinylbenzene.

12. A process according to claim 1 wherein the carboxylic cation exchange resin catalyst is a copolymer of methacrylic acid and divinylbenzene.

13. A process according to claim 1 wherein the reaction is conducted under pressure sufficient to maintain acrolein in a liquid state.

14. A process according to claim 1 wherein the reaction temperature is between about 40° C. and 120° C.

15. A process according to claim 1 wherein a polymerization inhibitor is added to the system.

16. A process for making hydracrylaldehyde which comprises reacting acrolein with water under superatmospheric pressure and in the presence of, as a hydration catalyst a weakly acidic solid carboxyl cation exchange resin insoluble in the system and having a pKa value of from about 3.9 to 6.9 and containing from about 0.1% to 5% metal ions that do not undergo a redox valence change in the system and recovering hydracrylaldehyde.

17. A process for making hydracrylaldehyde which comprises reacting acrolein with water under superatmospheric pressure sufficient to maintain acrolein in a liquid state in the presence of, as a hydration catalyst a weakly acidic carboxylic cation exchange resin insoluble in the system, having a pKa value of from about 4.7 to 6.5 and containing from about 0.5% to 1% metal ions that do not undergo a redox valence change in the system and recovering hydracrylaldehyde.

18. A process for making hydracylaldehyde which comprises reacting acrolein with water under superatmospheric pressure sufficient to maintain acrolein in a liquid state in the presence of, as a hydration catalyst a weakly acidic carboxylic cation exchange resin comprising a copolymer of polyacrylic acid and divinylbenzene and containing from 0.5 to 1% metal ions that do not undergo a redox valence change in the system, separating water from the reaction mixture and recovering hydracrylaldehyde.

19. A process according to claim 18 wherein the metal ion is an element of Group II–A.

20. A process according to claim 19 wherein the metal ion is calcium.

References Cited

UNITED STATES PATENTS

| 2,891,999 | 6/1959 | Langer | 260—614 |
| 2,434,110 | 1/1948 | Hatch et al. | 260—602 |

OTHER REFERENCES

Geyer, B. P., in Acrolein, John Wiley & Sons, 1962.
Rohm and Haas, IRC–50, October, 1962. p. 9.
Rohm and Haas, Ion Exchange With the Amberlite Resins, January, 1962 edition.

BERNARD HELFIN, Primary Examiner

R. H. LILES, Assistant Examiner

U.S. Cl X.R.

260—635